Sept. 27, 1966 R. A. PACL, JR 3,275,841
CONSTANT ENERGY PULSE GENERATOR
Filed June 8, 1962 2 Sheets-Sheet 1

INVENTOR
ROBERT A. PACL JR.

BY Edward M. Hassell
ATTORNEY

Sept. 27, 1966 R. A. PACL, JR 3,275,841

CONSTANT ENERGY PULSE GENERATOR

Filed June 8, 1962 2 Sheets-Sheet 2

United States Patent Office 3,275,841

Patented Sept. 27, 1966

3,275,841

CONSTANT ENERGY PULSE GENERATOR

Robert A. Pacl, Jr., Willow Grove, Pa., assignor to Sperry Rand Corporation, New York, N.Y., a corporation of Delaware Filed June 8, 1962, Ser. No. 201,095
3 Claims. (Cl. 307—88)

This invention relates to constant energy pulse generators, and more particularly to means for generating constant pulse signals for a magnetic writing circuit.

In writing information into a large number of transducers in a computer system, for example, it is desirable to record the information at some relatively constant energy level. At the same time, it is desirable to accomplish this without resorting to expensive electronic circuitry which might involve complicated limiter and pulse width control circuits.

It is an object of this invention to provide a novel constant energy pulse generator.

It is a further object of this invention to provide a novel circuit for generating electrical pulses of relative constant energy to a number of recording elements.

In accordance with the present invention, a constant energy pulse source is provided. A source of input pulse signals is applied to a transformer which includes one winding associated with a saturable reactor. The saturable reactor becomes saturated at a predetermined time period after the input pulse signals are applied to the transformer. An output signal is developed at an output circuit during the applied input signal until the saturable reactor reaches saturation, at which point the output signal is terminated.

Other objects and advantages of the present invention will be apparent and suggest themselves to those skilled in the art, from a reading of the following specification and claims in conjunction with the accompanying drawings in which:

Throughout the specification and claims, references will be made to constant energy levels in referring to electrical signals. This term may be defined as the volt-second product which is a constant.

Figure 1:
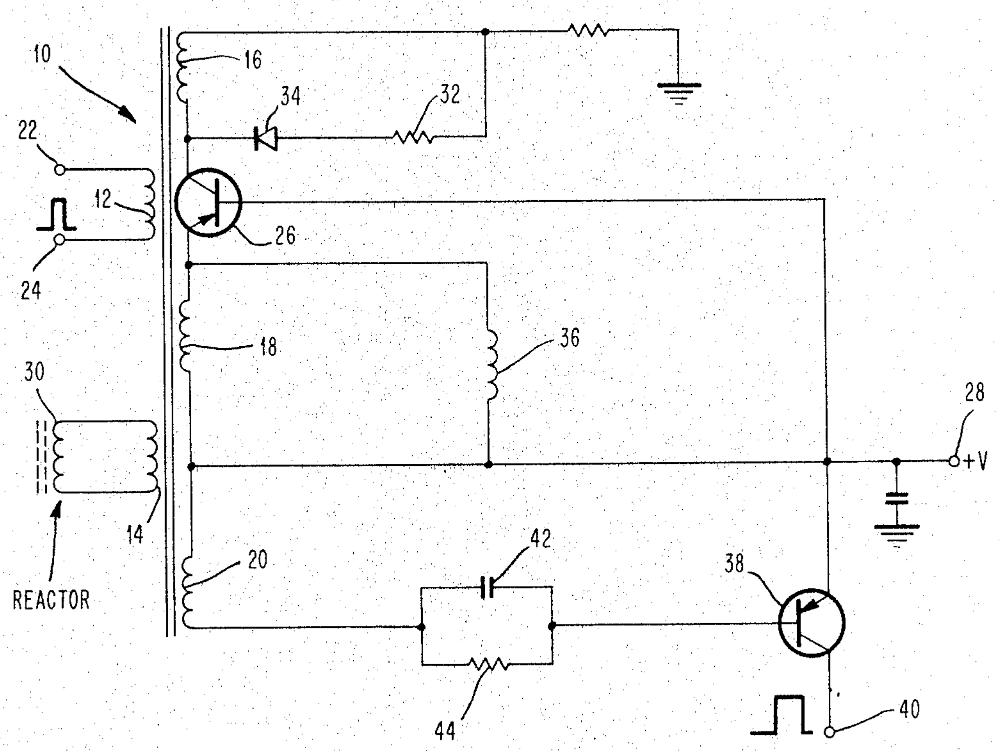
FIGURE 1 is a schematic diagram illustrating a constant energy pulse generator, in accordance with the present invention.

Referring particularly to FIGURE 1, a transformer 10 includes a plurality of windings 12, 14, 16, 18 and 20. A source of input pulse signals is connected to the winding 12 through a pair of input terminals 22 and 24.

A transistor 26 is normally cut-off when no pulse signal is applied to the winding 12. In this situation, the emitter to base voltage of the transistor 26 is zero. When an input pulse signal is applied to the winding 12, a voltage is induced in the winding 18 to increase the emitter-base voltage to cause the transistor 26 to become conducting. Thus, the transistor 26 may be considered as a switch.

The transformer 10 behaves substantially as a pulse transformer, with a linearly increasing current flowing from a voltage supply source 28 through the windings 16 and 18. Normally, this operation would continue if it were not for the presence of a saturable reactor 30 connected to the winding 14.

The saturable reactor 30 is initially in one of two remanent states. With the increasing current through the windings 16 and 18, a voltage is induced in the winding 14 which starts to drive the saturable reactor 30 to saturation. When the saturable reactor is saturated, a short circuit is reflected from the winding 14 to the winding 18 to cause the transistor 26 to return to its cut-off condition. An output signal is developed across the winding 20 from the time a signal is applied to the winding 12 until the saturable reactor reaches saturation.

The amount of volt seconds required to saturate the saturable reactor 30 is relatively constant.

Thus, as the supply voltage at the terminal 28 changes, the pulse width at the output terminal 40 also changes to keep the volt-seconds product at output terminal 40 essentially constant. For example, if the voltage at the terminal 28 rises, the width of the signal at the output terminal becomes narrower. Likewise if the voltage at the terminal 28 falls, the width of the signal at the output terminal becomes wider.

When the transistor 26 is turned off, a negative voltage is induced in the winding 14 and the saturable reactor 30 is switched back to its initial state. A resistor 32 and a diode 34 is connected across the winding 16 to protect the transistor 26 during the cut-off time. The inductor 36 supplies additional turn off current to the transistor 26.

A second transistor 38 is used to couple the output signal from the winding 20 to an output terminal 40. A capacitor 42 and resistor 44 supplies the turn off current through the output signal transistor 38.

Figure 2:
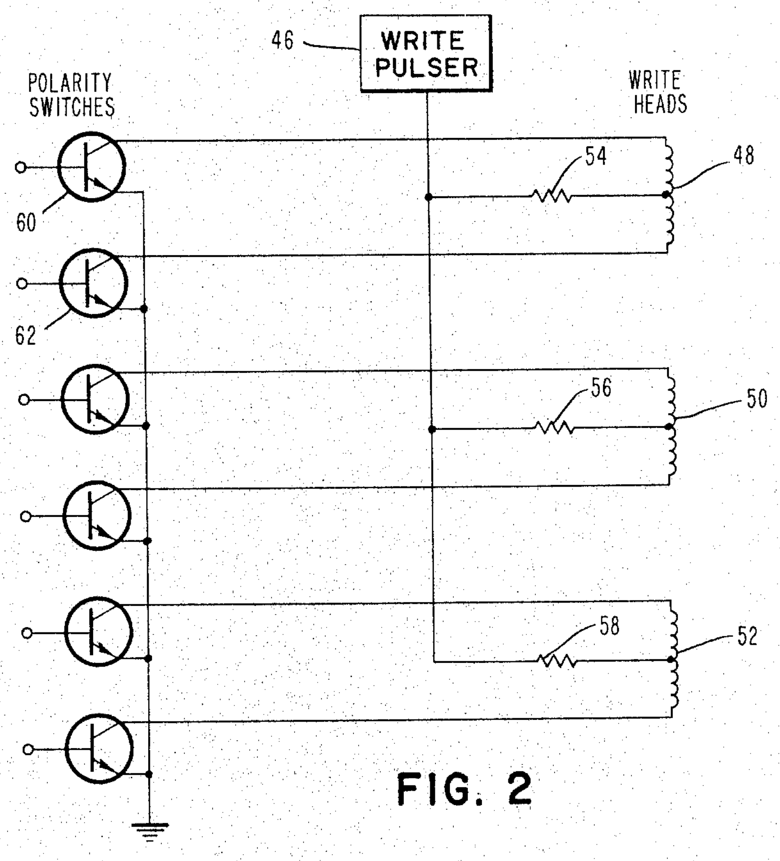
FIGURE 2 is a schematic diagram illustrating a part of a magnetic recording system in which the present invention may be utilized.

Referring to FIGURE 2, a basic circuit for supplying current pulses to write heads is illustrated. A write pulse generator 46, such as illustrated in FIGURE 1, supplies pulse signals to a plurality of magnetic heads which include coils 48, 50 and 52. These pulses are applied to the center taps of the coils 48, 50 and 52 through resistors 54, 56 and 58 respectively.

The ends of the coil 48 are connected to the collector electrodes of a pair of transistors 60 and 62. The coils 50 and 52 are connected to similar pairs of transistors in the same manner. The output pulse signals from the pulse generator 46 are illustrated by waveform 3A.

Figure 3:
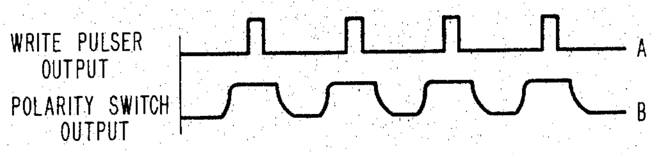
FIGURE 3 illustrates waveforms of various types of signals relating to the circuit of FIGURE 2.

The pair of transistors 60 and 62, as well as the other pairs, are normally cut-off. Upon the application of a pulse signal to the base electrode, designating that either a "1" or a "0" bit of information is to be recorded, the transistors 60 or 62 to which the pulse is applied will become conducting. The particular one of the transistors 60 or 62 which becomes conductive is dependent upon the type of signal to be recorded, that is a "1" or a "0." The information signals are selectively applied to the base of the transistor 60 or 62 at the same time that the pulse signals from the pulse generator 46 are applied to the collectors of the transistor. Both signals must be applied simultaneously to cause one of the transistors 60 or 62 to conduct. The signals from the write pulser 46, illustrated in FIGURE 3A, may be considered clock signals which are continuously generated while the information signals of FIGURE 3B are selectively generated dependent upon the information to be recorded.

When a pulse from the pulse generator 46 is applied to the magnetic write head, one of three conditions may exist. First, no current will flow through the write heads, corresponding to a no write pulse. Second, current may flow in one direction, corresponding to a write pulse of one polarity. Third, current may flow in the opposite direction, corresponding to a write pulse from the opposite polarity.

The condition which exists is determined by the input signals to the transistors 60 and 62. When a signal is applied to the base of one of these transistors, the selected transistor is driven to saturation, and when the write pulse is applied, current flows through one of the write heads through the selected transistor.

It is seen that the transistors 60 and 62 actually supply no current. Also, as seen in waveform 1B, the rise, fall time and the duration of the input signals are irregular as compared to the output pulses from the pulse generator 46. Since the pulse generator 46 is the controlling element to determine the duration or energy of the applied pulse, the transistors 60 and 62 need not be critical.

The embodiments of the invention in which an exclusive property or privilege is claimed are defined as follows:

1. A constant energy pulse source comprising a transformer having a plurality of windings, a saturable reactor having a first remanent state and a second saturated state associated with a first of said windings, a source of input pulse signals associated with a second of said windings, said input pulse signals being coupled through said first winding to said saturable reactor and being sufficient in duration and amplitude to drive said saturable reactor into said second saturated state from said first remanent state after a predetermined time period, a switching circuit including a normally non-conducting transistor, a third winding associated with said transistor for receiving a coupled signal from said first winding to switch said transistor to a conducting state when said input signal is applied to said first winding, a utilization circuit, a fourth winding for developing an output signal for said utilization circuit when said transistor is in a conducting state, and said saturable reactor causing said transistor to become non-conducting when it reaches said second saturated state to terminate the output signal applied to said utilization circuit.

2. The invention as set forth in claim 1 wherein said utilization circuit includes a second transistor normally non-conducting and becoming conducting during the duration of said output signal.

3. A constant energy pulse source comprising a source of input pulse signals, a transformer having four windings, said input signals being applied to a first winding, a saturable reactor having a first remanent state and a second saturated state of operation connected to a second winding of said transformer and adapted to become saturated to said second state from said first state after a predetermined time period upon the application of a single pulse signal exceeding a certain amplitude to said first winding of said transformer, a transistor connected to a third winding of said transformer, an output circuit associated with a fourth winding of said transformer for developing an output signal during the application of an input signal to said first winding until said saturable reactor becomes saturated, said input signals to said transformer causing constant energy output signals to be developed by said saturable reactor, and means for returning said saturable reactor from said second state to said first state to produce output signals of relatively constant energy at said output circuit.

References Cited by the Examiner

UNITED STATES PATENTS

| | | | |
|---|---|---|---|
| 2,849,703 | 8/1958 | Bindon et al. | 340—174.1 |
| 3,075,084 | 1/1963 | DeMiranda et al. | 307—88 |

BERNARD KONICK, *Primary Examiner.*

IRVING SRAGOW, *Examiner.*

R. R. HUBBARD, H. D. VOLK, J. MOFFITT, *Assistant Examiners.*